US012559667B2

(12) United States Patent
Zhang et al.

(10) Patent No.: US 12,559,667 B2
(45) Date of Patent: Feb. 24, 2026

(54) WELLBORE FLUIDS INCLUDING FLUID LOSS MATERIALS COMPRISING A POLYMER AND A BRIDGING MATERIAL AND RELATED METHODS

(71) Applicant: Schlumberger Technology Corporation, Sugar Land, TX (US)

(72) Inventors: Hui Zhang, Sugar Land, TX (US); Changping Sui, The Woodlands, TX (US); Zhipeng Wang, Houston, TX (US); Phuong-Nam Nguyen, Houston, TX (US); Shermin Akhtar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/581,108

(22) Filed: Feb. 19, 2024

(65) Prior Publication Data

US 2025/0263598 A1     Aug. 21, 2025

(51) Int. Cl.
*E21B 21/00*     (2006.01)
*C09K 8/588*     (2006.01)

(52) U.S. Cl.
CPC ............ *C09K 8/588* (2013.01); *E21B 21/003* (2013.01); *E21B 2200/08* (2020.05)

(58) Field of Classification Search
CPC .... C09K 8/588; E21B 21/003; E21B 2200/08
See application file for complete search history.

(56) References Cited

U.S. PATENT DOCUMENTS

| | | | |
|---|---|---|---|
| 3,979,304 | A | 9/1976 | Fischer |
| 3,979,305 | A | 9/1976 | Fischer |
| 3,989,632 | A | 11/1976 | Fischer |
| 4,191,249 | A | 3/1980 | Sarem |
| 4,525,285 | A | 6/1985 | Son |
| 4,531,594 | A * | 7/1985 | Cowan .................. C09K 8/035 |
| | | | 507/902 |
| 6,419,017 | B1 | 7/2002 | Metcalf |
| 6,884,760 | B1 | 4/2005 | Brand |
| 7,273,103 | B2 | 9/2007 | Szymaski |
| 7,533,723 | B2 | 5/2009 | Hughes |
| 10,144,858 | B2 | 12/2018 | Kennedy |

(Continued)

FOREIGN PATENT DOCUMENTS

| | | |
|---|---|---|
| CN | 105349117 A | 2/2016 |
| CN | 106367046 B | 2/2017 |
| CN | 109294531 B | 2/2019 |

*Primary Examiner* — Silvana C Runyan
(74) *Attorney, Agent, or Firm* — Kyle R. Miiller

(57)     ABSTRACT

A wellbore fluid includes an aqueous base fluid, and a fluid loss material formulated and configured to form a filtercake on surfaces of an earth formation responsive to exposure to a wellbore pressure. The fluid loss material includes at least one polymer, and a bridging material including a fatty acid salt of at least one of an alkali metal, an alkaline metal, ammonium, quaternary ammonium, a Group IIIA element, a Group IVA element, a Group VA element, a Group IB element, a Group IIB element, or a Group VIIB element of the periodic table, the bridging material comprising an oil-soluble material formulated and configured to dissolve out of the filtercake to form channels in the filtercake. Related methods and wellbore fluids are disclosed.

19 Claims, 2 Drawing Sheets

(56)  References Cited

U.S. PATENT DOCUMENTS

| 2007/0249504 A1* | 10/2007 | Ballard | C09K 8/512 |
| | | | 507/221 |
| 2009/0192052 A1* | 7/2009 | Zhang | C09K 8/36 |
| | | | 507/140 |
| 2014/0190695 A1* | 7/2014 | Van Zanten | C09K 8/88 |
| | | | 166/305.1 |
| 2015/0152315 A1* | 6/2015 | Luyster | E21B 36/003 |
| | | | 166/302 |
| 2018/0155602 A1* | 6/2018 | Zhang | C09K 8/845 |
| 2018/0320049 A1* | 11/2018 | Shumway | E21B 21/062 |

* cited by examiner

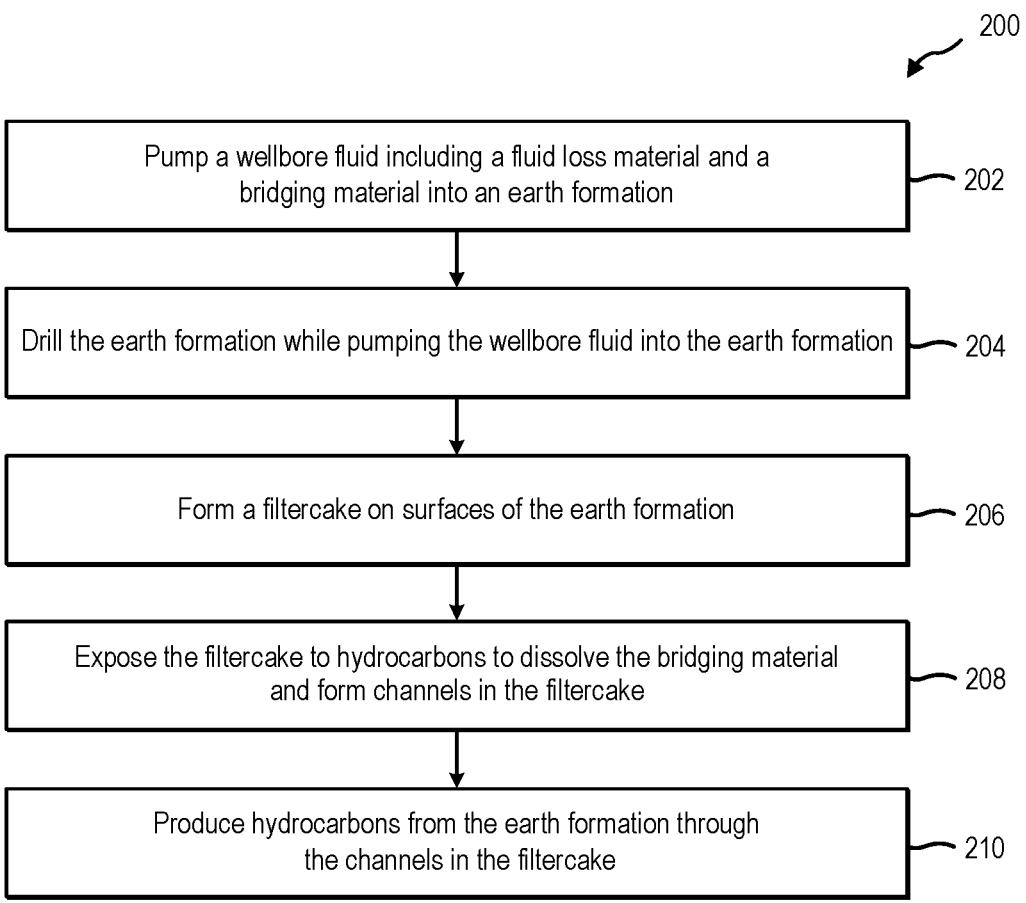

200

Pump a wellbore fluid including a fluid loss material and a
bridging material into an earth formation — 202

Drill the earth formation while pumping the wellbore fluid into the earth formation — 204

Form a filtercake on surfaces of the earth formation — 206

Expose the filtercake to hydrocarbons to dissolve the bridging material
and form channels in the filtercake — 208

Produce hydrocarbons from the earth formation through
the channels in the filtercake — 210

FIG. 2

WELLBORE FLUIDS INCLUDING FLUID LOSS MATERIALS COMPRISING A POLYMER AND A BRIDGING MATERIAL AND RELATED METHODS

CROSS-REFERENCE TO RELATED APPLICATIONS

N/A

BACKGROUND OF THE DISCLOSURE

Wellbore drilling operations include drilling a bore in a formation to access reservoirs of hydrocarbons and other subsurface resources. During drilling of a wellbore, various fluids may be circulated into the wellbore through a drill pipe and drill bit, and may subsequently flow upward through the wellbore to the surface. For example, a drilling fluid (e.g., an aqueous-based fluid, such as drilling mud) may be pumped down the inside of the drill pipe, through the drill bit, and into the wellbore. The drilling fluid returns to the surface through the annulus. The drilling fluid may lubricate and cool the drill bit and simultaneously facilitate removal of formation cuttings.

In some instances, undesirable formation conditions may result in the loss of wellbore fluids to the formation. For example, wellbore fluids may leave the borehole through fissures and/or fractures in the formation or through a porous formation material (e.g., a porous rock matrix) surrounding the borehole. To reduce loss of the drilling fluids, the drilling fluid may include one or more fluid loss agents, such as xanthan gum and hydroxyethyl cellulose (HEC).

In some instances, rather than being circulated back to the wellhead, some of the drilling fluid may flow into the formation via permeable areas of the formation in a phenomenon known as lost circulation. Methods of reducing the fluid loss during drilling and other operations include formulating the drilling fluid to form a filtercake on surfaces of the formation. The filtercake may substantially prevent or reduce the filtration of fluid from the wellbore to the formation.

After drilling operations are complete, the filtercake must be removed from surfaces of the formation in hydrocarbon bearing zones of the formation. Conventionally, the filtercake is broken by exposing the filtercake to one or more breakers, such as acids, acid precursors, and enzymes.

SUMMARY

In some embodiments, a wellbore fluid comprises an aqueous base fluid, and a fluid loss material formulated and configured to form a filtercake on surfaces of an earth formation responsive to exposure to a wellbore pressure. The fluid loss material comprises at least one polymer, and a bridging material comprising a fatty acid salt of at least one of an alkali metal, an alkaline metal, ammonium, quaternary ammonium, a Group IIIA element, a Group IVA element, a Group VA element, a Group IB element, a Group IIB element, or a Group VIIB element of the periodic table, the bridging material comprising an oil-soluble material formulated and configured to dissolve out of the filtercake to form channels in the filtercake.

In some embodiments, a method of operating a wellbore comprises pumping a wellbore fluid into a wellbore extending through an earth formation. The wellbore fluid comprises an aqueous base fluid, and a fluid loss material comprising a polymer, and a hydrophobic bridging material having the general formula $MR_y$, wherein M is a metal selected from the group consisting of at least one of an alkali metal, an alkaline metal, ammonium, quaternary ammonium, a Group IIIA element, a Group IVA element, a Group VA element, a Group IB element, a Group IIB element, or a Group VIIB element of the periodic table, R is a $C_{12}$ to $C_{30}$ fatty acid carboxylate, and y is an integer from 1 to 7. The method further includes forming a filtercake on surfaces of the earth formation, exposing the filtercake to a hydrocarbon from the earth formation, dissolving the hydrophobic bridging materials from the filtercake responsive to exposure of the filtercake to the hydrocarbon to from channels extending through the filtercake, and producing hydrocarbons through the channels.

In some embodiments, a wellbore fluid comprises an aqueous base fluid, a fluid loss material formulated and configured to form a filtercake on surfaces of an earth formation, and a weighting material. The fluid loss material comprises a biopolymer, and a bridging material comprising a fatty acid salt of a $C_{12}$ to $C_{30}$ fatty acid.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2 is a simplified flow diagram illustrating a method of drilling a wellbore, according to at least one embodiment of the disclosure.

DETAILED DESCRIPTION

Figure 1:
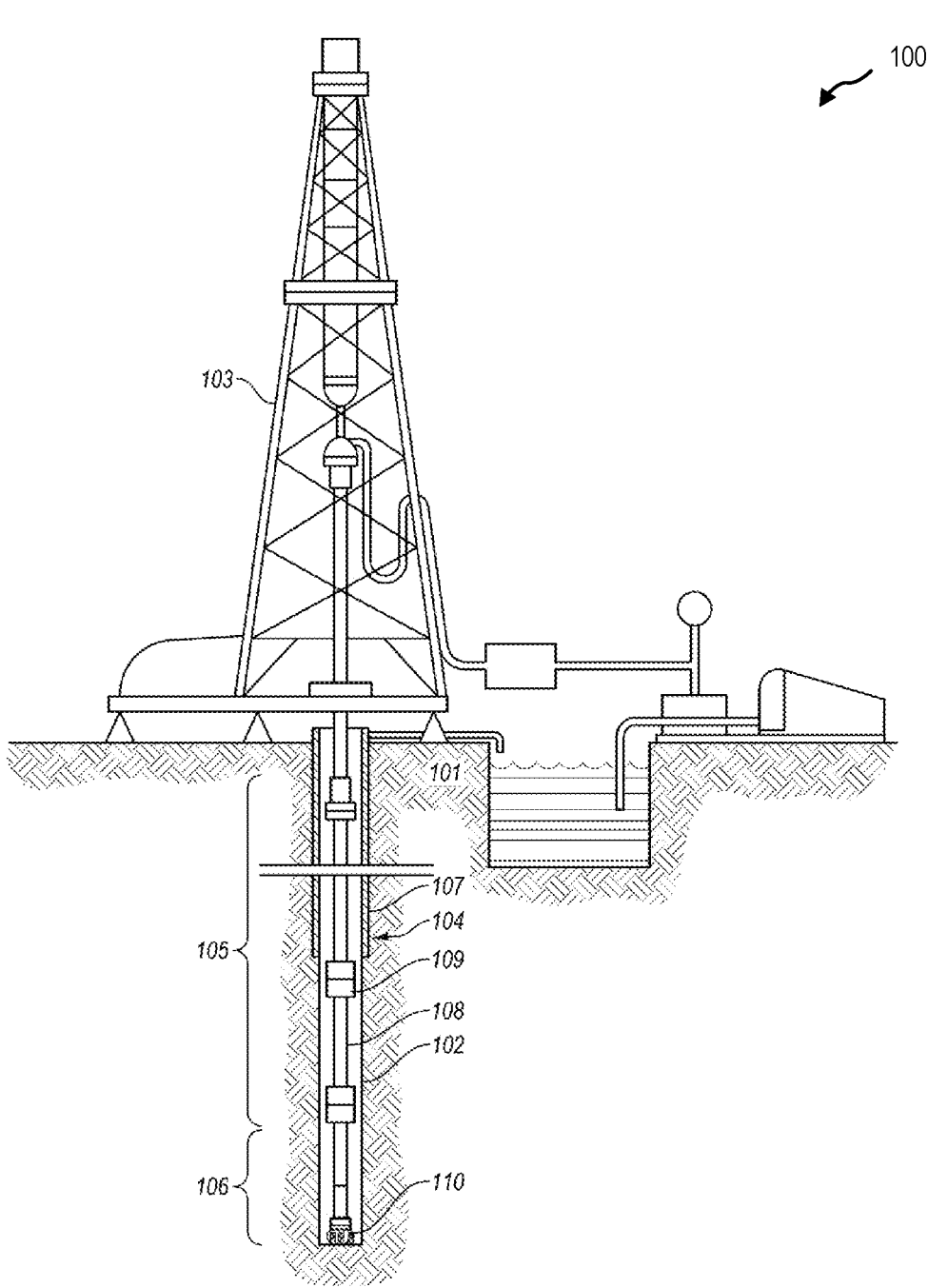
FIG. 1 is a representation of a drilling system for drilling an earth formation to form a wellbore, according to at least one embodiment of the present disclosure.

As used herein, the term "barrel" is a volume equivalent to 42 gallons. Quantities of various materials (e.g., additives) are often quantified in barrels in the oil and gas industry.

As used herein, a "Group IA element" of the periodic table means and includes at least one of lithium, sodium, potassium, rubidium, cesium, or francium; a "Group IIA element" of the periodic table means and includes at least one of beryllium, magnesium, calcium, strontium, barium, or radium; a "Group IIIA element" of the periodic table means and includes at least one of boron, aluminum, gallium, indium, thallium, or ununtrium; a "Group IVA element" of the periodic table means and includes at least of carbon, silicon, germanium, tin, lead, or flerovium; a "Group VA element" of the periodic table means and includes at least one of nitrogen, phosphorus, arsenic, antimony, bismuth, or ununpentium; a "Group IB element" of the periodic table means and includes at least one of copper, silver, gold, or roentgenium; a "Group IIB element" of the periodic table means and include at least one of zinc, cadmium, mercury, or copernicium; and a "Group VIIB element" of the periodic table means and includes at least one of manganese, technetium, rhenium, or bohrium. Group IA elements are also known as and referred to as alkali metals, and Group IIA elements are also known as and referred to as alkaline metals.

This disclosure generally relates to devices, systems, and methods for wellbore fluid additives for downhole applications, such as mitigation of fluid loss using one or more fluid loss materials. The fluid additive may be used for wellbore operations in a wellbore extending through an earth formation. For example, the fluid additive may be used in a wellbore fluid, such as a drilling fluid, drill-in fluids (also referred to as "reservoir drill-in fluids" (RDF)), workover fluids, spacer fluids (e.g., a fluid introduced into the wellbore after a drilling fluid and prior to a cement composition to flush residual drilling fluid from the annulus), stimulation fluids, or other wellbore fluids. The fluid additive may be referred to herein as a "fluid loss material," a "fluid loss additive," or a "fluid loss control agent."

The fluid loss material may be provided as a component of the wellbore fluid, such as of a drilling fluid. The wellbore fluid may include, for example, a base fluid, the fluid loss material, and one or more additives. The fluid loss material may comprise a polymer and at least one bridging material. The polymer and the bridging material are formulated and configured to form a filtercake on surfaces of the earth formation though which the wellbore extends. The filtercake may include a network comprising the polymer and the bridging material dispersed throughout the polymer network. The filtercake may be substantially hydrophobic such that aqueous-based wellbore fluids do not permeate through the filtercake. Accordingly, the filtercake functions to substantially reduce (e.g., prevent) infiltration of aqueous-based wellbore fluids to the earth formation.

The polymer may include one or more biopolymers and/or one or more synthetic polymers. In some embodiments, the polymer includes a biopolymer. The polymer may be formulated and configured to form a filtercake on surfaces of the earth formation. In some embodiments, the polymer comprises a hydrophobic material, such as a hydrophobically-modified material. In some embodiments, the polymer comprises hydrophobically-modified starch including at least one hydrophobic group chemically bonded to the starch.

The bridging material may be hydrophobic and may also be referred to herein as a "hydrophobic bridging material." The bridging material may be oil-soluble such that, responsive to exposure to hydrocarbons, the bridging material dissolves out of the filtercake (e.g., out of the polymeric network of the polymer) and into the hydrocarbons, leaving channels in the filtercake. The hydrocarbons may travel from the earth formation, through the channels in the filtercake, and to the wellbore during production operations (e.g., after drilling operations are complete). In some embodiments, the channels are hydrophobic and oleophilic, such as when the polymer of the filtercake comprises a hydrophobic material and/or includes hydrophobic functional groups. The channels may have a dimension (e.g., a diameter) corresponding to the size of the bridging material. In some embodiments, the channels have a dimension within a range of from about 2 μm to about 100 μm. The size of the channels may facilitate improved flow of hydrocarbons through the filtercake compared to filtercakes not including the bridging materials (and including, for example, other bridging materials, such as hydrophobically-coated materials, which may not dissolve from the filtercake into the hydrocarbons).

The bridging material may include a fatty acid salt of one or more fatty acids and at least one of an alkali metal, an alkaline metal, ammonium, quaternary ammonium, a Group IIIA element, a Group IVA element, a Group VA element, a Group IB element, a Group IIB element, or a Group VIIB element of the periodic table. The bridging material may have the general formula, $M_xR_y$, wherein M is one of lithium, sodium, potassium, rubidium, cesium, beryllium, magnesium, calcium, strontium, barium, radium, ammonium, quaternary ammonium, boron, aluminum, gallium, indium, carbon, silicon, germanium, tin, nitrogen, phosphorus, arsenic, copper, silver gold, zinc, cadmium, manganese, technetium, or rhenium; R is a $C_{12}$ to $C_{30}$ carboxylate compound that may be branched or linear and may be saturated or unsaturated; and each of x and y are independently an integer between 1 and 7. In some embodiments, the bridging material comprises a calcium salt of a fatty acid. In some embodiments, the bridging material comprises calcium stearate.

The fluid loss material (e.g., the polymer and the bridging material) may be dispersed in, for example, a continuous phase of the wellbore fluid (e.g., the drilling fluid). The fluid loss material may be formulated and configured to form a filtercake on surfaces of the earth formation, such as between the wellbore and the earth formation. The filtercake may be substantially impermeable to aqueous materials (e.g., water, the drilling fluid) and may exhibit a permeability to lipophilic materials (e.g., hydrocarbons within reservoir sections of the earth formation). For example, the bridging material may comprise an oil-soluble material formulated and configured to dissolve out of the filtercake responsive to exposure of the filtercake to hydrocarbons from the formation. The dissolution of the bridging materials from the filtercake leaves channels extending through the filtercake. The channels may be oleophilic. The channels may facilitate flow of the hydrocarbons from the earth formation, through the filtercake, and to the wellbore. In some embodiments, the dissolution of the bridging materials from the filtercake facilitates the dissolution and degradation of the filtercake, removing the filtercake from the surfaces of the earth formation.

The bridging material in the fluid loss material facilitates the use of the fluid loss material in a wellbore fluid (e.g., a drilling fluid) including the fluid loss material to form a filtercake during drilling operations and without having to expose the filtercake to harsh chemicals (e.g., acids, acid precursors, oxidizers, chelating agents, enzymes) to break the filtercake after completion of a drilling operation and prior to hydrocarbon production. Conventional filtercakes may be substantially impermeable to hydrocarbons, substantially preventing the flow of hydrocarbons through the filtercake. Such filtercakes may be required to be degraded (e.g., with acids, acid precursors, oxidizers, chelating agents, enzymes, or other breaker fluids) prior to producing hydrocarbons from the earth formation. According to embodiments described herein, the bridging material is oil-soluble and formulated and configured to dissolve out of the filtercake responsive to exposure to hydrocarbons, leaving channels in the filtercake. The channels defined in the filtercake responsive to dissolution of the bridging materials provide flow channels through which oleophilic materials (e.g., hydrocarbons) may be produced during production. In addition, prior to production of hydrocarbons from the earth formation and through the wellbore (e.g., such as during drilling operations), the bridging material may remain in the filtercake and the filtercake may be substantially impermeable to water, drilling fluids, and other aqueous wellbore fluids. Accordingly, the fluid loss material including the polymer and the bridging materials facilitates the formation of a filtercake and the subsequent production of hydrocarbons from the earth formation without removing the filtercake (e.g., by producing hydrocarbons through channels defined in the filtercake). Since the filtercake is not broken and hydrocarbons are produced through the filtercake, the wellbore equipment may not be exposed to harsh chemical breakers (e.g., acids, acid precursors, oxidizers, chelating agents, solvents) that may damage the wellbore and wellbore equipment, extending the operating life of the wellbore and wellbore equipment.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore

102, or combinations thereof. Swarf or other cuttings formed by use of a mill may be lifted to surface, or may be allowed to fall downhole.

During drilling operations, a wellbore fluid (e.g., a drilling fluid) may be used to facilitate lubrication and cooling of the bit 110 and removal of earth formation 101 cuttings. In some embodiments, such as during drilling of hydrocarbon-bearing zones (e.g., producing zones) of the earth formation 101, the wellbore fluid may include one or more fluid loss materials formulated and configured to reduce and/or prevent the infiltration of wellbore fluids (e.g., the drilling fluid) to the earth formation 101, such as through the pores, fractures, cavities, and other parts of the earth formation 101. For example, the fluid loss materials may be formulated and configured to form a filtercake on surfaces of the earth formation 101, the filtercake being substantially impermeable to aqueous materials (e.g., the filtercake exhibiting a permeability to water less than about 0.1 mD). In some embodiments, the wellbore fluid comprises a reservoir drill-in fluid formulated and configured for drilling through the reservoir section of the earth formation 101.

The wellbore fluid may include a base fluid, the fluid loss material (e.g., the polymer and the bridging material), and one or more additives (e.g., one or more of additional bridging materials, viscosifiers, thinners (e.g., dispersion aids), weighting materials, filtration control agents, shale stabilizers, pH buffers, emulsifiers, corrosion inhibitors, emulsion activators, gelling agents, shale inhibitors, defoamers, surfactants, foaming agents, scale inhibitors, solvents, rheological additives, or other additives).

In some embodiments, the wellbore fluid comprises an aqueous-based drilling fluid and may be referred to as a "drilling mud." The base fluid may include water, sea water, brine, or a salt-containing aqueous solution. By way of non-limiting example, the base fluid may include a brine including water and one or more salts (e.g., one or more organic salts and/or one or more inorganic salts).

The one or more salts may provide a desired density to the wellbore fluid and may also reduce the effect of the drilling fluid on hydratable clays and shales the earth formation 101. The salts may include salts of one or more of sodium, calcium, aluminum, magnesium, zinc, potassium, strontium, or lithium, and salts of one or more of chlorides, bromides, carbonates, iodides, chlorates, bromates, formates, nitrates, oxides, phosphates, sulfates, silicates, or fluorides. In some embodiments, the salt comprises a divalent halide, such as an alkaline earth halide (e.g., calcium chloride ($CaCl_2$), calcium bromide ($CaBr_2$)), or a zinc halide. The salt may include cesium formate (HCOOCs), sodium bromide (NaBr), potassium bromide (KBr), and cesium bromide (CsBr). The particular composition of the salt may be selected based on compatibility with the earth formation 101 and/or to match the brine phase of a completion fluid. The fluid loss material may be formulated and configured to be stable in monovalent brines and divalent brines, such as formate-based brines, halide-based brines, or other brines.

In some embodiments, the weight percent of the salt is less than the weight percent of the water in the base fluid. The salt may constitute from about 5.0 weight percent to about 50.0 weight percent of the drilling fluid, such as from about 5.0 weight percent to about 10.0 weight percent, from about 10.0 to about 20.0 weight percent, from about 20.0 weight percent to about 30.0 weight percent, from about 30.0 weight percent to about 40.0 weight percent, or from about 40.0 weight percent to about 50.0 weight percent of the drilling fluid. However, the disclosure is not so limited, and the weight percent of the salt and the water in the drilling fluid may be different than that described.

The base fluid may constitute from about 40 weight percent to about 80 weight percent of the wellbore fluid, such as from about 40 weight percent to about 50 weight percent, from about 50 weight percent to about 60 weight percent, from about 60 weight percent to about 70 weight percent, or from about 70 weight percent to about 80 weight percent. However, the disclosure is not so limited, and the base fluid may constitute a different weight percent of the wellbore fluid than that described.

As described above, the wellbore fluid may include at least one fluid loss material formulated and configured to reduce an amount of wellbore fluid (e.g., the drilling fluid) lost in the earth formation 101, such as in producing zones of the earth formation 101, during various wellbore operations (e.g., during drilling operations). The fluid loss material may include at least one polymer and at least one bridging material.

The fluid loss material may facilitate formation of a filtercake on porous surfaces of the earth formation 101. For example, due to the pressure of the wellbore 102 exceeding the pressure of the earth formation 101, during drilling operations, the wellbore fluid including the fluid loss material is forced against surfaces of the earth formation 101. As a filtrate of the wellbore fluid (which may be substantially free of the fluid loss material) initially passes from the wellbore 102 through the earth formation 101, a filtercake comprising the fluid loss material (the materials substantially impermeable to the earth formation 101) is formed on the surfaces of the earth formation 101. The filtercake comprises the polymer material and the bridging material dispersed throughout the polymer material.

As initially formed, the filtercake may exhibit a relatively low permeability to water. The relatively low permeability to water may substantially reduce or prevent the passage of aqueous materials from the wellbore 102 to the earth formation 101. During drilling operations and other wellbore operations, the filtercake may substantially reduce (e.g., prevent) loss of wellbore fluids (e.g., drilling fluids) from the wellbore 102 to the earth formation 101 through the filtercake. Responsive to exposure hydrocarbons, at least a portion of the filtercake (e.g., the bridging materials) may be dissolved in the hydrocarbons, leaving channels within the filtercake. Hydrocarbons may be produced from the earth formation 101 through the channels of the filtercake during hydrocarbon production. In some embodiments, surfaces of the channels may be hydrophobic (e.g., such as in embodiments where the polymer comprises a hydrophobic material and/or a hydrophobically-modified material (e.g., hydrophobically-modified starch)). The channels defined in the filtercake may facilitate the passage of hydrocarbon materials through the filtercake, such as from the earth formation 101 to the wellbore 102 during production without exposing the filtercake to harsh breaker chemicals, such as acids, acid precursors, oxidizers, chelating agents, or enzymes.

The at least one polymer of the fluid loss material may include one or more of starch, modified starch (e.g., carboxymethyl starch, hydroxyethyl starch, hydroxypropyl starch, hydrophobically-modified starch), xanthan gum, polyanionic cellulose, carboxymethylcellulose, carboxymethyl hydroxyethylcellulose, hydroxyalkylcellulose, hydrophobically-modified cellulose (e.g., cellulose modified by lauryl glycidyl ether or cetyl glycidyl ether), glycogen, locust bean gums, wellan gum, scleroglucan gum, guar gum, alginate, carrageenan (e.g., one or more of i-carrageenan, k-carrageenan, l-carrageenan) (also referred to as carrageenan gum), gellan gum, alginate, a polyamide resin, a polyacrylate, a polyacrylate ester, polyacrylamide (e.g., crosslinked with polyethyleneimine), styrene, styrene-butadiene, an acrylamide acrylate polymer, an acrylamido-methyl-propane sulfonate polymer, a reaction product of the at least one acrylamide monomer and at least one sulfonated anionic monomer, a hydrophobically-modified synthetic polymer (e.g., polyhydroxypropylmethacrylate), a vinyl polymer, or another polymer, a copolymer (e.g., a polymer of two different monomers), a terpolymer (e.g., a polymer of three monomers), or another polymer.

In some embodiments, the at least one polymer comprises a biopolymer (e.g., a natural polymer produced by the cells of living organisms). In some embodiments, the biopolymer comprises a polysaccharide. The biopolymer may include, for example, at least one polysaccharide, such as one or more of starch, glycogen, cellulose, locust bean gums, xanthan gum, wellan gum, scleroglucan gum, guar gum, alginate, carrageenan (e.g., one or more of i-carrageenan, k-carrageenan, l-carrageenan), gellan gum, or another biopolymer.

In some embodiments, the at least one polymer comprises starch. The starch may be modified by at least one of crosslinking, hydroxyalkylation (e.g., hydroxypropylation), or carboxymethylation. In addition, the modified starch may be hydrophobized with one or more hydrophobic functional groups chemically bonded to exposed surfaces of the modified starch and may be referred to as "hydrophobic starch" or "hydrophobically-modified starch." In some embodiments, the modification of the starch (e.g., by one or more of crosslinking, hydroxyalkylation, or carboxymethylation), and the one or more hydrophobic groups of the starch may facilitate formation of a filtercake with the drilling fluid including the fluid loss material and the bridging material to include hydrophobic channels (e.g., channels defined by hydrophobic and/or hydrophobically-modified materials) through which oleophilic materials (e.g., hydrocarbons) may pass during hydrocarbon production operations.

The starch may include at least one naturally occurring polymer found in plant cells and in some microorganisms. By way of non-limiting example, the starch may include at least one of corn starch, potato starch, tapioca starch, wheat starch, rice starch, sago starch, sorghum starch, pea starch, roots containing a high starch content, etc. However, the disclosure is not so limited, and the starch may comprise a different type of starch.

In some embodiments, the starch includes at least about 80 percent by weight of amylopectin, such as at least about 85 percent by weight, at least about 90 percent by weight, or even at least about 95 percent by weight of amylopectin.

The starch may include multiple hydroxyl groups. For example, each glucose of the starch may include three hydroxyl groups, which may be able to react with one or more compounds (e.g., acid anhydrides, organic chloro compounds, aldehydes, epoxy, ethylenic compounds) to modify (e.g., derivatize) the starch. In addition, the ether linkage between glycosidic units of the starch (e.g., the C—O—C) bond may be reacted during crosslinking of the starch to crosslink the starch.

As described above, the starch may be crosslinked. For example, the starch may be crosslinked with at least one of phosphorous oxychloride (also referred to as phosphoryl chloride), epichlorohydrin, cyanuric chloride, other epihalohydrins, formaldehyde, dialdehydes, oxidized sucralose, a trimetaphosphate (e.g., sodium trimetaphosphate), vinyl sulfone, diepoxides, diisocyanates, bis(hydroxymethyl) urea, and adipic acetic anhydrides. In some embodiments, the crosslinked starch comprises at least two crosslinkers. For example, some of the glucose units may be crosslinked with at least one type of crosslinker, and at least other glucose units may be crosslinked with at least another type of crosslinker.

In some embodiments, the crosslinker includes at least one of phosphorous oxychloride, epichlorohydrin, or cyanuric chloride. In some embodiments, the crosslinked starch comprises phosphorous oxychloride crosslinked starch. In other embodiments, the crosslinked starch comprises epichlorohydrin. In yet other embodiments, the crosslinked starch comprises cyanuric chloride. In some embodiments, the crosslinked starch comprises at least two of phosphorous oxychloride, epichlorohydrin, or cyanuric chloride.

The crosslinker may bridge glucose units of the starch. For example, the crosslinker may be located at the ether bond between glucose units of the starch, may react with hydroxyl groups of the starch, or both. In some embodiments, the crosslinked starch includes crosslinkers at the ether linkage between glucose units and crosslinkers that have replaced one or more hydroxyl groups of the starch.

The amount of the crosslinker in the crosslinked starch may be within a range of from about 0.5 weight percent to about 10.0 weight percent of the starch, based on the dry weight of the modified starch.

In addition, as described above, the starch may be hydroxyalkylated. For example, the modified starch may be hydroxypropylated. In some embodiments, crosslinked starch may be reacted with an alkylene oxide (e.g., formaldehyde, ethylene oxide, propylene oxide, butylene oxide) to form crosslinked and hydroxyalkylated starch. The hydroxyalkylation of the starch may replace one or more of the hydroxyl groups of the glucose units with hydroxyalkyl groups. In some embodiments, the crosslinked hydroxyalkylated starch contains from about 0.5 weight percent to about 20.0 weight percent reacted alkylene oxide (e.g., propylene oxide in the case of hydroxypropylation) based on the dry weight of the modified starch.

The modified starch may further be carboxymethylated. The modified starch (which may be crosslinked, hydroxyalkylated, or both) may be reacted with an acetate (e.g., chloroacetic acid, sodium chloroacetate) in an etherification reaction to form a carboxymethylated starch (CMS) (such as starch acetate). The amount of carboxymethylation may be quantified by a degree of substitution (DS) corresponding to the average number of hydroxyl groups substituted per glucose unit. The degree of substitution may be within a range of from about 0.1 to about 0.5, such as from about 0.1 to about 0.2, from about 0.2 to about 0.3, from about 0.3 to about 0.4, or from about 0.4 to about 0.5. However, the disclosure is not so limited, and the degree of substitution may be different than those described.

In addition to the at least one of crosslinking, the hydroxyalkylation, and the carboxymethylation of the starch, the modified starch may further be hydrophobized to form the hydrophobic modified starch. In other words, modified starch may be reacted with one or more hydrophobic groups to impart hydrophobicity to the modified starch. In some embodiments, the modified starch is reacted with at least two types of functional groups. The modified starch may be reacted with one or more of an epoxide (e.g., butyl glycidyl ether), an alkyl ketene dimer (AKDs) (e.g., structures including hydrophobic alkyl groups extending from a beta-propiolacetate ring), an alkenyl succinic anhydride (ASA) (e.g., octenyl succinic anhydride, tetrapropenyl succinic anhydride), or a fatty acid anhydride. In other embodiments, the starch includes hydrophobic groups and comprises hydrophobically-modified starch and may not be crosslinked, hydroxyalkylated, or carboxymethylated.

In some embodiments, the at least one hydrophobic group may react with the modified starch at hydroxyl groups of the glucose units, at hydroxyl groups formed during hydroxyalkylation, with an oxygen atom of a carbon oxygen double bond, and/or at other groups attached to the modified starch by one or more other hydrophobic groups.

In some embodiments, the at least one hydrophobic group may constitute from about 3.0 weight percent to about 30.0 weight percent, such as from about 3.0 weight percent to about 5.0 weight percent, from about 5.0 weight percent to about 10.0 weight percent, from about 10.0 weight percent to about 15.0 weight percent, from about 15.0 weight percent to about 20.0 weight percent, or from about 20.0 weight percent to about 30.0 weight percent of the hydrophobic modified starch.

In some embodiments, the polymer includes a synthetic polymer. By way of non-limiting example, the synthetic polymer may include a crosslinked polymeric material comprising a polymer (e.g., a copolymer) formed from at least one acrylamide monomer and at least one sulfonated anionic monomer. In some embodiments, the synthetic polymer includes a reaction product of the at least one acrylamide monomer and at least one sulfonated anionic monomer. In some embodiments, the synthetic polymer comprises a higher order copolymer and/or block copolymers, such as a terpolymer, a quaternary polymer, or another higher order polymer including the at least one acrylamide monomer and the at least one sulfonated anionic monomer.

The synthetic polymer may include at least one monomeric unit (monomer units) comprising the monomers used to form the synthetic polymer. By way of non-limiting example, where the synthetic polymer comprises a copolymer of the reaction product of at least one acrylamide monomer and at least one sulfonated anionic monomer, the synthetic polymer includes first monomeric units of the at least one acrylamide monomer and second monomeric units of the at least one sulfonated anionic monomer.

The at least one acrylamide monomer may include one or more of acrylamide, unsubstituted acrylamide, methacrylamide, N-substituted acrylamides (e.g., alkylacrylamides, N-methylolacrylamide, N-isopropylacrylaminde, diacetone acrylamide, N-alkyl acrylamide (where alkyl is $C_1$ to $C_{14}$), and N,N-dialkyl acrylamides (where the alkyl is $C_1$ (e.g., N,N-dimethylacrylamide) to $C_{14}$), N-cycloalkane, N-(2-hydroxyethyl) acrylamide, N-isopropyl acrylamide, N-[3-(dimethylamino)propyl]acrylamide, or acryloyl morpholine). In embodiments wherein the at least one acrylamide monomer comprises an N-substituted acrylamide, the N-substituted acrylamide may comprise N,N-dialkyl acrylamides (e.g., N,N-dimethylacrylamide). The alkyl groups of the N,N-dialkyl acrylamides may be linear, branched, or cyclic. In some embodiments, the at least one acrylamide monomer comprises N,N-dimethylacrylamide.

In some embodiments, a mole percent of the at least one acrylamide monomer in the synthetic polymer may be within a range of from about 0.1 mole percent to about 50.0 mole percent of the synthetic polymer, such as within a range of from about 0.1 mole percent to about 10.0 mole percent, from about 10.0 mole percent to about 20.0 mole percent, from about 20.0 mole percent to about 30.0 mole percent, from about 30.0 mole percent to about 40.0 mole percent, or from about 40.0 mole percent to about 50.0 mole percent of the synthetic polymer.

The at least one sulfonated anionic monomer may include one or more of 2-acrylamido-2-methyl-propanesulfonic acid (AMPS®), a trademark of the Lubrizol Corporation (also referred to as acrylamide tertiary butyl sulfonic acid (ATBS)), vinyl sulfonates, styrene sulfonic acid, allyl sulfonates, or styrene sulfonic acid. The at least one sulfonated anionic monomer may facilitate tolerance of the viscosifier to divalent cations in the drilling fluid brine, such as calcium and magnesium. In some embodiments, the at least one sulfonated anionic monomer is provided as a salt, such as an ammonium salt. For example, the at least one sulfonated anionic monomer may be provided as an ammonium salt of 2-acrylamido-2-methyl-propanesulfonic acid or a sodium salt of 2-acrylamido-2-methyl-propanesulfonic acid.

In some embodiments, a mole percent of the at least one sulfonated anionic monomer in the synthetic polymer may be within a range of from about 50.0 mole percent to about 99.0 mole percent of the synthetic polymer, such as within a range of from about 50.0 mole percent to about 60.0 mole percent, from about 60.0 mole percent to about 70.0 mole percent, from about 70.0 mole percent to about 80.0 mole percent, or from about 80.0 mole percent to about 99.0 mole percent of the synthetic polymer A mole percent of the at least one sulfonated anionic monomer in the synthetic polymer may be greater than a mole percent of the at least one acrylamide monomer in the synthetic polymer.

In some embodiments, a molar ratio of the acrylamide monomer to the sulfonated anionic monomer may be within a range of from about 1.0:1.0 to about 1.0:100.0, such as from about 1.0:1.0 to about 1.0:5.0, from about 1.0:5.0 to about 1.0:10.0, from about 1.0:10.0 to about 1.0:25.0, from about 1.0:25.0 to about 1.0:50.0, from about 1.0:50.0 to about 1.0:75.0, or from about 1.0:75.0 to about 1.0:100.0.

In some embodiments, in addition to the at least one acrylamide monomer and the at least one sulfonated anionic monomer, the synthetic polymer may include one or more additional monomers. The one or more additional monomers may include one or more of lipophilic monomers, such as isobornyl methacrylate, 2-ethyl hexyl acrylate, N-alkyl and N,N-dialkyl acrylamide, or styrene; or one or more anionic monomers, such as maleic acid, tetrahydrophtalic acid, fumaric acid, or acrylic acid, which may be incorporated into the polymer formed from the at least one acrylamide monomer and the at least one sulfonated anionic monomer.

The synthetic polymer may include an amphoteric material (e.g., a material formulated to act as either an acid or a base). In some embodiments, the synthetic polymer comprises a water-soluble branched sulfonated amphoteric polymer and includes at least a N,N-dialkylacrylamide monomer (e.g., N,N-dimethylacrylamide), and a sulfonic acid-containing monomer (e.g., 2-acrylamido-2-methyl-propane-sulfonic acid).

In some embodiments, the synthetic polymer further includes a branching agent. The branching agent may include a tetraallyl ammonium halide, such as tetraallyl ammonium chloride. The branching agent may constitute from about 0.1 weight percent to about 5.0 weight percent of the synthetic polymer, such as from about 0.1 weight percent to about 0.5 weight percent, from about 0.5 weight percent to about 1.0 weight percent, from about 1.0 weight percent to about 2.0 weight percent, from about 2.0 weight percent to about 3.0 weight percent, or from about 3.0 weight percent to about 5.0 weight percent of the synthetic polymer.

In some embodiments, the synthetic polymer may further include one or more crosslinkers. The amount of crosslinking of the synthetic polymer may be selected based on the desired viscosity of the polymer. The crosslinker may include one or more crosslinker monomers, such as methylenebisacrylamide, divinyl benzene, allyl methacrylate, tetra allyloxethane, or other allylic bifunctional monomers. The crosslinkers may facilitate between about 0.25% and about 10% of intermolecular crosslinking of the polymer of the synthetic polymer.

In some embodiments, the synthetic polymer includes a reaction product of N,N-dimethylacrylamide and 2-acrylamido-2-methyl-propanesulfonic acid. The reaction product may further include at least one branching agent, such as tetraallyl ammonium chloride (TAAC). In some embodiments, the reaction product may further include at least one crosslinker.

The polymer may constitute from about 0.5 weight percent to about 10.0 weight percent of the wellbore fluid, such as from about 0.5 weight percent to about 1.0 weight percent, from about 1.0 weight percent to about 2.0 weight percent, from about 2.0 weight percent to about 3.0 weight percent, from about 3.0 weight percent to about 5.0 weight percent, from about 5.0 weight percent to about 7.0 weight percent, or from about 7.0 weight percent to about 10.0 weight percent of the wellbore fluid. In some embodiments, the polymer constitutes from about 0.5 weight percent to about 6.0 weight percent of the drilling fluid. However, the disclosure is not so limited, and the weight percent of the polymer in the wellbore fluid may be different than that described.

The polymer may be present in the wellbore fluid at a concentration within a range of from about 10 kg/m³ (about 3.5 pounds per barrel (ppb)) to about 200 kg/m³ (about 70.2 kg/m³), such as from about 10 kg/m³ (about 3.5 pounds per barrel (ppb)) to about 30 kg/m³ (about 10.5 ppb, from about 30 kg/m³ (about 10.5 ppb) to about 50 kg/m³ (about 17.5 ppb), from about 50 kg/m³ (about 17.5 ppb) to about 100 kg/m³ (about 35.1 ppb), from about 100 kg/m³ (about 35.1 ppb) to about 150 kg/m³ (about 52.6 ppb), or from about 150 kg/m³ (about 52.6 ppb) to about 200 kg/m³ (about 70.2 ppb). However, the disclosure is not so limited, and the polymer may be present in the wellbore fluid at concentrations different than that described.

In addition to the polymer, the wellbore fluid includes a bridging material. The bridging material may include a material having the general formula, $M_xR_y$, wherein M is one of a Group IA element of the periodic table, a Group IIA element of the periodic table, Group IIIA element of the periodic table, a Group IVA element of the periodic table, a Group VA element of the periodic table, a Group IB element of the periodic table, a Group IIB element of the periodic table, a Group VIIB element of the periodic table, ammonium, or quaternary ammonium; R is a $C_{12}$ to $C_{30}$ carboxylate compound that may be branched or linear and may be saturated or unsaturated; and each of x and y are independently an integer between 1 and 7. In some embodiments, the bridging material has the general formula, $MR_y$, wherein M, R, and y are the same as described above. The value of y may depend on the particular element of M. For example, where M is calcium, y may be equal to 2.

In some embodiments, M comprises one of lithium, sodium, potassium, rubidium, cesium, beryllium, magnesium, calcium, strontium, barium, radium, ammonium, quaternary ammonium, boron, aluminum, gallium, indium, carbon, silicon, germanium, tin, nitrogen, phosphorus, arsenic, copper, silver gold, zinc, cadmium, manganese, technetium, or rhenium. In some embodiments, M is a metal. For example, M may include one or more of lithium, sodium, potassium, rubidium, cesium, beryllium, magnesium, calcium, strontium, barium, radium, manganese, technetium, copper, silver, gold, zinc, cadmium, aluminum, gallium indium, thallium, tin, lead, arsenic (a metalloid), antimony (a semi-metal), or bismuth. In some embodiments, M comprises an alkali metal and the bridging material comprise an alkali metal fatty acid salt. In other embodiments, M comprises an alkaline metal and the bridging material comprises an alkaline metal fatty acid salt. By way of non-limiting example, in some embodiments, M comprises calcium and the bridging material comprises a calcium fatty acid salt.

In some embodiments, R comprises a carboxylate of a fatty acid, wherein the hydrogen atom of the carboxyl group of fatty acid has been removed. In other words, in some such embodiment, R comprises a conjugate base (carboxylate) of a corresponding fatty acid. In some such embodiments, the bridging material comprises a salt of one or more fatty acids. The fatty acid may be saturated or unsaturated. In addition, the fatty acid may be linear, branched, or cyclic. In some embodiments, the fatty acid is linear and comprises an unsaturated fatty acid (e.g., a mono-unsaturated fatty acid). In some embodiments, R comprises a hydrophobic group and the bridging material comprises a hydrophobic material.

The fatty acid may include one or more of lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, carboceric acid, montanic acid, nonacosylic acid, melissic acid, linolenic acid, stearidonic acid, eicosapentaenoic acid, cervonic acid, linoleic acid, linolelaidic acid, arachidonic acid, docosatetraenoic acid, palmitoleic acid, vaccenic acid, oleic acid, elaidic acid, erucic acid, myristoleic acid, sapienic acid, galoleic acid, eicosenoic acid, ericosadienoic acid, docosadienoic acid, pinolenic acid, eleostearic acid, eicosatrienoic acid, stearidonic acid, ararchidonic acid, eicosatetraenoic acid, or another acid.

In some embodiments, the fatty acid is saturated and includes one or more of lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, carboceric acid, montanic acid, nonacosylic acid, or melissic acid. In some embodiments, the fatty acid is unsaturated and includes one or more of linolenic acid, stearidonic acid, eicosapentaenoic acid, cervonic acid, linoleic acid, linolelaidic acid, arachidonic acid, docosatetraenoic acid, palmitoleic acid, vaccenic acid, oleic acid, elaidic acid, erucic acid, myristoleic acid, sapienic acid, galoleic acid, eicosenoic acid, ericosadienoic acid, docosadienoic acid, pinolenic acid, eleostearic acid, eicosatrienoic acid, stearidonic acid, arachidonic acid, eicosatetraenoic acid, or another acid. The fatty acid may be mono-unsaturated, di-unsaturated, tri-unsaturated, tetra-unsaturated, penta-unsaturated, or hexa-unsaturated.

In some embodiments, the fatty acid comprises a $C_{18}$ fatty acid, such as at least one of stearic acid, oleic acid, lauric acid, linoleic acid, or α-linoleic acid. In some embodiments, the fatty acid comprises stearic acid. In some such embodiments, the bridging material comprises a stearate, such as an alkaline stearate (e.g., calcium stearate), an oleate, a laurate, or a linoleate.

In some embodiments, the bridging material comprises a laurate (e.g., the fatty acid comprise lauric acid), a myristate (e.g., the fatty acid comprises myristic acid), a palmitate (e.g., the fatty acid comprises palmitic acid), a stearate (e.g., the fatty acid comprises stearic acid), a behenate group (e.g., the fatty acid comprises behenic acid), a lignocerate (e.g., the fatty acid comprises lignoceric acid), a pentadecanoate (e.g., the fatty acid comprises pentadecanoic acid), a heptadecanoate (e.g., the fatty acid comprises heptadecanoic acid), an octacosanoate (e.g., the fatty acid comprises octacosanoic acid), an oleate (e.g., the fatty acid comprises oleic acid), a myristoleate (e.g., the fatty acid comprises myristoleic acid), a palmitoleate (e.g., the fatty acid comprises palmitoleic acid), a sapienate (e.g., the fatty acid comprises sapienic acid), an elaidate (e.g., the fatty acid comprises elaidic acid), a vaccenic acid ester (e.g., the fatty acid comprises vaccenic acid), a linoleate (e.g., the fatty acid comprises linoleic acid), a linolelaidate (e.g., the fatty acid comprises linolelaidic acid), an arachidonate (e.g., the fatty acid comprises arachidonic acid), an eicosapentaenoate (e.g., the fatty acid comprises eicosapentaenoic acid), an erucate (e.g., the fatty acid comprises erucic acid), a docosahexaenoate (e.g., the fatty acid comprise docosahexaenoic acid), a stearidonate (e.g., the fatty acid comprises stearidonic acid), a gadoleate (e.g., the fatty acid comprises gadoleic acid), an eicosenoate (e.g., the fatty acid comprises eicosenoic acid), an eleostearate (e.g., the fatty acid comprises eleostearic acid), an eicosatrienoate (e.g., the fatty acid comprises eicosatrienoic acid), or another fatty acid salt.

In some embodiments, the bridging material comprises an alkaline salt of the fatty acid. By way of non-limiting example, the bridging material may include a calcium salt of the fatty acid. In some embodiments, the bridging material comprises one or more of calcium stearate, calcium oleate, calcium laurate, or calcium linoleate. In some embodiments, the bridging material comprises, consists essentially of, or consists of calcium stearate.

Accordingly, the bridging material may include a fatty acid salt of one or more fatty acids and at least one of an alkali metal, an alkaline metal, ammonium, quaternary ammonium, a Group IIIA element, a Group IVA element, a Group VA element, a Group IB element, a Group IIB element, or a Group VIIB element of the periodic table.

The bridging material may include at least one fatty acid salt of a first fatty acid, and at least another fatty acid salt of a second fatty acid. In some embodiments, the bridging material comprises more than one type of fatty acid salt.

The bridging material may have a median particle size (e.g., a diameter) within a range of from about 2 μm to about 100 μm, such as from about 2 μm to about 5 μm, from about 5 μm to about 10 μm, from about 10 μm to about 20 μm, from about 20 μm to about 40 μm, from about 40 μm to about 60 μm, from about 60 μm to about 80 μm, or from about 80 μm to about 100 μm. However, the disclosure is not so limited, and the average particle size of the bridging material may be different than that described. The bridging material may exhibit a spherical shape, a platelet shape, a rod shape, a cylindrical shape, or another shape.

The bridging material may constitute from about 0.5 weight percent to about 10.0 weight percent of the wellbore fluid, such as from about 0.5 weight percent to about 1.0 weight percent, from about 1.0 weight percent to about 0 weight percent, from about 1.0 weight percent to about 2.0 weight percent, from about 2.0 weight percent to about 3.0 weight percent, from about 3.0 weight percent to about 5.0 weight percent, from about 5.0 weight percent to about 7.0 weight percent, or from about 7.0 weight percent to about 10.0 weight percent of the wellbore fluid. In some embodiments, the bridging material constitutes from about 1.0 weight percent to about 5.0 weight percent of the drilling fluid. However, the disclosure is not so limited, and the weight percent of the bridging material in the wellbore fluid may be different than that described.

The bridging material may be present in the wellbore fluid at a concentration within a range of from about 14.3 kg/m$^3$ (about 5.0 ppb) to about 200.0 kg/m$^3$ (about 70.2 ppb), such as from about 14.3 kg/m$^3$ (about 5.0 ppb) to about 28.5 kg/m$^3$ (about 10.0 ppb), from about 28.5 kg/m$^3$ (about 10.0 ppb) to about 57.0 kg/m$^3$ (about 20.0 ppb), from about 57.0 kg/m$^3$ (about 20.0 ppb) to about 85.5 kg/m$^3$ (about 30.0 ppb), from about 85.5 kg/m$^3$ (about 30.0 ppb) to about 114.0 kg/m$^3$ (about 40.0 ppb), from about 114.0 kg/m$^3$ (about 40.0 ppb) to about 142.5 kg/m$^3$ (about 50.0 ppb), or from about 142.5 kg/m$^3$ (about 50.0 ppb) to about 200.0 kg/m$^3$ (about 70.2 ppb). In some embodiments, the bridging material is present in the wellbore fluid at a concentration within a range of from about 28.5 kg/m$^3$ (about 10.0 ppb) to about 142.5 kg/m$^3$ (about 50.0 ppb).

A weight ratio of the polymer to the bridging material may be within a range of from about 0.01:1.0 to about 2.0:1.0, such as from about 0.01:1.0 to about 0.05:1.0, from about 0.05:1.0 to about 0.1:1.0, from about 0.1:1.0 to about 0.2:1.0, from about 0.2:1.0 to about 0.5:1.0, from about 0.5:1.0 to about 1.0:1.0, from about 1.0:1.0 to about 1.5:1.0, or from about 1.5:1.0 to about 2.0:1.0. In some embodiments, the wellbore fluid includes a greater weight percent of the polymer than of the bridging material.

The wellbore fluid may further include one or more additives selected based on the desired properties of the drilling fluid. As discussed above, and by way of non-limiting example, the one or more additional additives may include one or more of additional bridging materials (e.g., uncoated bridging materials), viscosifiers, fluid thinners, weighting materials, filtration control agents, shale stabilizers, pH buffers, emulsifiers, corrosion inhibitors, emulsion activators, gelling agents, shale inhibitors, defoamers, surfactants, foaming agents, scale inhibitors, solvents, rheological additives, or other additives that may be suitable depending on the particular operation.

The one or more additional bridging materials may be hydrophobically-coated, or may be uncoated. Hydrophobically-coated bridging materials include hydrophobically-coated particles of at least one of calcium carbonate, zinc carbonate, barium carbonate, a coated metal oxide (e.g., hemalite, ilmenite, magnesium oxide), dolomite (calcium magnesium carbonate), colemanite, ulexite, analcite, apatite, bauxite, brucite, gibbsite, hydrotalcite, galena, hematite, magnetite, iron oxides, siderite, or celestite. The hydrophobic coating may include one or more hydrophobic functional groups, such as, for example, hydrophobic fatty acids. In some embodiments, the hydrophobic group comprises substantially the same material composition as the hydrophobic of the bridging material and/or of the polymer. In some embodiments, the one or more additional bridging materials is uncoated and includes at least one of calcium carbonate, magnesium citrate, calcium citrate, calcium succinate, calcium maleate, calcium tartrate, magnesium tartrate, bismuth citrate, other suspended salts, mica, nutshells, or fibers.

The viscosifiers may include one or more of the polymers described above. For example, the viscosifiers may include one or more clay (e.g., bentonite clay), polymers, or biopolymers.

Wellbore fluid thinners may include lignosulfates, lignitic materials, modified lignosulfonates, polyphosphates, tannin, and polyacrylates. The thinners may facilitate improved rheological properties of the drilling fluid (e.g., a reduction in flow resistance) and a reduction in gel development. In addition, the thinner may reduce a thickness of filtercakes formed by the drilling fluid, counteract the effects of salts, and reduce the effects of water on the earth formation 101.

Weighting materials (also referred to as "weighting agents") may include one or more of barite (BaSO$_4$), iron oxide (e.g., Fe$_2$O$_3$, Fe$_3$O$_4$), calcium carbonate (CaCO$_3$), magnesium carbonate (MgCO$_3$), manganese oxide (Mn$_3$O$_4$), or combinations thereof. The weighting material may be present in the drilling fluid and facilitate increasing the density of the drilling fluid up to about 2.88 g/cm$^3$ (about 24 pounds per gallon (ppg)). In some embodiments, the weighting material comprises barite and magnesium carbonate.

The pH buffer may include an amine stabilizer, such as one or more of triethanolamine (C$_6$H$_{15}$NO$_3$) (TEOA), methyldiethanol amine (C$_5$H$_{13}$NO$_2$) (MDEA), dimethylethanol amine (C$_4$H$_{11}$NO) (DMEA), diethanol amine (C$_4$H$_{11}$NO$_2$) (DEA), monoethanol amine (MEA), cyclic organic amines, sterically hindered amines, amides of fatty acid, or other suitable tertiary, secondary, or primary amines and ammonia. In some embodiments, the pH buffer includes magnesium oxide.

The emulsifiers may include calcium polyvalent metal soaps, phosphate esters, fatty acids, fatty acid soaps, alkylbenzene sulfonate, lime, amidoamines, and imidazolines. The corrosion inhibitor may include iron oxide, aluminum bisulfate, zinc carbonate, zinc chromate, an amine, or another material. The gelling agent may include one or more of a clay and a crosslinked polyvinylpyrrolidone, an acrylamide copolymer, guar, sodium bentonite, or another material. The shale inhibitor may include one or more of amine tartaric salt, ammonium lauric salt, polyammonium, alkyl diammonium, an amphoteric polymer, an organosilicate polymer, a silicone polymer, or another material. Defoamers may include one or more of 2-octanol, oleic acid, paraffinic waxes, amide waxes, sulfonated oils, organic phosphates, silicone oils, mineral oils, or dimethylpolysiloxane.

The surfactants may include anionic surfactants, cationic surfactants, and/or non-ionic surfactants. The foaming agents may include a nonionic surfactant including polymeric materials. The scale inhibitors may include an acrylic acid polymer, a maleic acid polymer, or a phosphonate. The solvents may include hydrocarbon solvents.

A density of the drilling fluid may be within a range of from about 1,080 kg/m$^3$ to about 2,500 kg/m$^3$, such as from about 1,080 kg/m$^3$ to about 1,200 kg/m$^3$, from about 1,200 kg/m$^3$ to about 1,400 kg/m$^3$, from about 1,400 kg/m$^3$ to about 1,600 kg/m$^3$, from about 1,600 kg/m$^3$ to about 1,800 kg/m$^3$, from about 1,800 kg/m$^3$ to about 2,000 kg/m$^3$, from about 2,000 kg/m$^3$ to about 2,200 kg/m$^3$, or from about 2,200 kg/m$^3$ to about 2,500 kg/m$^3$. However, the disclosure is not so limited, and the density of the drilling fluid may be different than that described. In some embodiments, the density of the wellbore fluid is at least about 2,000 kg/m$^3$.

In some embodiments, the fluid loss additive may function as a viscosifier and impart a desired viscosity to the wellbore fluid. For example, the fluid loss additive may facilitate lifting of cuttings during drilling operations. In some embodiments, the wellbore fluid does not include an additional viscosifier in addition to the fluid loss additive.

In use and operation, the fluid loss material including the polymer and the hydrophobic bridging material may be added to a wellbore fluid, such as to a drilling fluid. The wellbore fluid including the fluid loss material may form a filtercake on surfaces of the earth formation 101. As initially formed, the filtercake may be substantially impermeable to aqueous fluids (e.g., aqueous-based drilling fluids and aqueous-based wellbore fluids). Responsive to exposure to hydrocarbons, the bridging materials may dissolve out of the filtercake, leaving channels defined within the filtercake. In some embodiments, such as where the polymer is hydrophobic or hydrophobically-modified, the channels may be hydrophobic. The channels may extend through a thickness of the filtercake (e.g., between the wellbore 102 and the earth formation 101). The channels may facilitate the flow of oleophilic materials (e.g., hydrocarbons) therethrough, such as from the earth formation 101 to the wellbore 102, such as during production operations. In some such embodiments, hydrocarbons may be produced through the filtercake, such as through the channels without breaking or degrading the filtercake.

The filtercake formed by the wellbore fluid including the fluid loss material and the bridging material may exhibit a permeability of less than about 0.1 mD (millidarcy) with respect to water. In addition, after removal of the bridging materials, the filtercake exhibit a permeability with respect to hydrocarbons (e.g., oil). Conventional filtercakes may exhibit a higher permeability with respect to water and may not be permeable with respect to hydrocarbons. In some embodiments, the permeability of the filtercake to hydrocarbons is at least about 100 times the permeability of the filtercake to water. Filtercakes formed from bridging materials that are only coated with hydrophobic materials, may not be permeable to hydrocarbons, or may exhibit a reduced permeability to hydrocarbons since the bridging materials may remain in the filtercake. For example, bridging materials comprising calcium carbonate or hydrophobically-coated calcium carbonate may not exhibit as high of a permeability with respect to hydrocarbons compared to filtercakes including the bridging materials described herein (e.g., having the general formula $M_xR_y$, as described above).

FIG. 2 is a simplified flow diagram illustrating a method 200 of operating a wellbore, according to at least one embodiment of the disclosure. The method 200 includes pumping a wellbore fluid (e.g., a drilling fluid) including a fluid loss material comprising a polymer and a bridging material into an earth formation, as shown at act 202. The polymer and the bridging material may include one or more of the respective polymer materials and bridging materials described above. The wellbore fluid may include, for example, a base fluid, the fluid loss material, and one or more additives, as described above.

The method 200 may further include drilling the earth formation while pumping the wellbore fluid into the earth formation, as shown at act 204. In some embodiments, the wellbore fluid is circulated through the drill string, out of the drill bit, and through the annulus between the drill string and the earth formation. The wellbore fluid may facilitate removal of cuttings from the wellbore as the wellbore fluid circulates through the wellbore.

With continued reference to FIG. 2, the method 200 may include forming a filtercake on surfaces of the earth formation, as shown at act 206. In some embodiments, a filtercake is formed on surfaces of the earth formation (such as on hydrocarbon producing zones of the earth formation) defining the wellbore. The filtercake may be formed of and include the fluid loss material. For example, the filtercake may include a matrix comprising the polymer and the bridging material dispersed throughout the filtercake.

The method 200 may further include exposing the filtercake to hydrocarbons to dissolve the bridging materials and form channels in the filtercake, as shown in act 208. For example, the filtercake may be exposed to hydrocarbons from the earth formation. Responsive to exposure to the hydrocarbons, the bridging materials may dissolve and be removed from the filtercake. For example, the bridging materials may be carried out of the filtercake by the hydrocarbons. Removal of the bridging materials may leave channels defined within the filtercake. In some embodiments, the channels are defined by hydrophobic surfaces of the filtercake.

The method 200 may further include producing hydrocarbons from the earth formation through the channels of the filtercake, as shown in act 210. For example, responsive to completing a drilling operation, hydrocarbons may be produced from the earth formation through the hydrophobic channels of the filtercake. The hydrocarbons may be produced without degrading (e.g., breaking) the filtercake, such as by exposing the filtercake to breaker chemicals (e.g., acids, enzymes) formulated and configured to degrade the filtercake. Producing the hydrocarbons without degrading the filtercake may advantageously extend the operating life of wellbore equipment and may reduce costs and time associated with producing the hydrocarbons compared to embodiments where the filtercake is degraded and removed prior to production of hydrocarbons.

EXAMPLES

Example 1

Properties of different aqueous-based drilling fluids were measured. A first drilling fluid ("Drilling Fluid 1") did not include a calcium stearate bridging material and a second drilling fluid ("Drilling Fluid 2") included 10 ppb of calcium stearate bridging material. The composition of the aqueous-based drilling fluids was the same, other than the presence of a calcium stearate bridging material in the second drilling fluid. Table 1 below includes the composition of the aqueous-based drilling fluids. The rheological properties of the aqueous-based drilling fluids was measured, as shown in Table 1. The rheological tests were performed using a 6 speed Fann rheometer at about 48.9° C. (about 120° F.). The plastic viscosity (in centipoise) of the aqueous-based muds was measured at each of the 6 different speeds of the rheometer (e.g., at each of 600 RPM, 300 RPM, 200 RPM, 100 RPM, 6 RPM, and 3 RPM).

TABLE 1

|  | Drilling Fluid 1 | Drilling Fluid 2 |
| --- | --- | --- |
| Water (ppb) | 306 | 306 |
| CaCl$_2$ (ppb) | 73.2 | 73.2 |
| Starch (ppb) | 11 | 11 |
| MgO (ppb) | 2 | 2 |
| Calcium Carbonate (ppb) | 40 | 40 |
| Thermal Extender (ppb) | 3.5 | 3.5 |
| Oxygen Scavenger (ppb) | 0.5 | 0.5 |
| Calcium Stearate (ppb) | 0 | 10 |
| pH | 9.4 | 9.5 |
| R600 (cP) | 77 | 57 |
| R300 (cP) | 53 | 36 |
| R200 (cP) | 44 | 29 |
| R100 (cP) | 32 | 20 |
| R6 (cP) | 14 | 5.5 |
| R3 (cP) | 12 | 4 |

As shown in Table 1, the aqueous-based drilling fluid including the calcium stearate exhibited a lower viscosity compared to the aqueous-based mud not including the calcium stearate.

In addition, the lubricity (the coefficient of friction (CoF)) of the aqueous-based muds was measured. The coefficient of friction was measured under different applied load forces, both before hot rolling (BHR) and after hot rolling (AHR), as shown in Table 2 below. Hot rolling was performed at about 137.8° C. (about 280° F.) for about 16 hours.

TABLE 2

| | Drilling Fluid 1, CoF | Drilling Fluid 2, CoF |
|---|---|---|
| Before hot roll, 150 psi force | 0.220 | 0.154 |
| Before hot roll, 250 psi force | 0.401 | 0.289 |
| After hot roll, 150 psi force | 0.193 | 0.169 |
| After hot roll, 250 psi force | 0.372 | 0.308 |

As shown in Table 2, both before hot rolling and after hot rolling, the aqueous-based mud including the calcium stearate exhibited a relatively lower coefficient of friction (e.g., a greater lubricity) than the aqueous-based mud not including the calcium stearate. Accordingly, wellbore compositions including the bridging materials described herein may exhibit a relatively greater lubricity compared to similar aqueous-based wellbore fluids not including the bridging materials.

Example 2

The performance of different aqueous-based drilling fluids were compared to one another. The results are shown in Table 3 below. Fluid 1 included a fluid loss material comprising xanthan, starch (unmodified starch), and non-coated calcium carbonate. Fluid 2 included a fluid loss material comprising hydrophobically-modified starch and hydrophobically-coated calcium carbonate. Fluid 3 included the same composition as Fluid 2, except Fluid 3 also included 10 ppb of calcium stearate. Each fluid included the same concentration of the fluid loss material and other components of the fluid were the same.

Each drilling fluid was passed through a ceramic disk filter (e.g., a FAO-00 ceramic disk) at about 3.45 MPa (about 500 psi) and at a temperature between about 65.6° C. (about 150° F.) and about 93.3° C. (about 200° F.) using a HPHT filter press. The aqueous-based fluids were exposed to the pressure for about 4 hours to build the filtercake. The volume of aqueous fluid that passed through the filter (and the filtercake that was formed on the surface of the filter) was measured for each drilling fluid.

After the filtercake was formed (e.g., after 4 hours), the aqueous-based fluid was removed from the cell and the cell was filled with a hydrocarbon. The pressure of the cell was maintained at about 2.07 MPa (about 300 psi) at a temperature between about 65.6° C. (about 150° F.) and about 93.3° C. (about 200° F.). The flow of the hydrocarbon through the filtercakes was measured. The results are shown in Table 3 below.

TABLE 3

| | Fluid 1 | Fluid 2 | Fluid 3 (with Calcium Stearate) |
|---|---|---|---|
| Brine Filtrate (mL/hr) | 5.2 | 3.7 | 3.5 |
| Hydrocarbon Flow (mL/hr) | 1.7 | 4.0 | 30.0-100.0 |

As shown in Table 3, Fluid 3 including the 10 ppb of calcium stearate formed a filtercake exhibiting a relatively lower permeability to water than Fluid 1 or Fluid 2. In addition, the filtercake formed by Fluid 3 exhibited significantly greater permeability to hydrocarbons than the filtercakes formed by Fluid 1 and Fluid 2. For example, the volume of hydrocarbons that flowed through the filtercake formed from Fluid 3 substantially greater than the volume of hydrocarbons that flowed through the filtercake formed from Fluid 1 or Fluid 2.

Example 3

An aqueous-based drilling fluid ("Fluid 1") including a calcium bromide brine, calcium carbonate bridging materials, and a weighting material was prepared. A similar aqueous-based drilling fluid ("Fluid 2") was prepared, but also including 25 ppb calcium stearate. The composition of each aqueous-based drilling fluid is shown in Table 4.

Each drilling fluid was passed through a ceramic disk filter (e.g., a FAO-00 ceramic disk) at about 3.45 MPa (about 500 psi) and a temperature of about 132.2° C. (about 270° F.) using a HPHT filter press. The aqueous-based fluids were exposed to the pressure for about 4 hours to build the filtercake. The volume of aqueous fluid that passed through the filter (and the filtercake that was formed on the surface of the filter) was measured for each drilling fluid.

After forming the filtercake, the aqueous-based fluid was removed from the cell and the cell was filled with a hydrocarbon. The pressure of the cell was maintained between about 68.9 kPa (about 10 psi) and about 137.9 kPa (about 20 psi). The flow of the hydrocarbon through the filtercakes was measured. The fluid formulations are shown in Table 4 below.

TABLE 4

| | Fluid 1 | Fluid 2 |
|---|---|---|
| CaCl$_2$ brine (ppb) | 543 | 543 |
| CaCO$_3$ (ppb) | 60 | 60 |
| Weighting Material (ppb) | 30 | 30 |
| Barite (ppb) | 100 | 100 |
| Calcium Stearate (ppb) | 0 | 25 |
| Density (lb/gal) | 16.5 | 16.5 |

Responsive to the HPHT filter press, 15 mL of fluid filtrate passed through the filtercake for Fluid 1 while 12 mL of fluid filtrate passed through the filtercake for Fluid 2. Accordingly, the drilling fluid including the calcium stearate (Fluid 2) formed a filtercake exhibiting a relatively lower permeability to water than the similar drilling fluid not including the calcium stearate. In addition, the filtercake of the drilling fluid not including the calcium stearate (Fluid 1) was substantially impermeable to hydrocarbons, while the filtercake of the drilling fluid including the calcium stearate was permeable to the hydrocarbons. The filtercake of the drilling fluid including calcium stearate dissolved responsive to exposure to the hydrocarbons. At the end of the test, a large portion of the filtercake of the drilling fluid including the calcium stearate had washed off of the filter.

Accordingly, drilling fluids including calcium stearate bridging materials form filtercakes exhibited a relatively lower permeability to water and a relatively greater permeability to hydrocarbons compared to similar drilling fluids not including the calcium stearate.

Example 4

The performance of a drilling fluid including a calcium chloride brine, a fluid loss material comprising starch, calcium carbonate bridging materials, and calcium stearate bridging materials was measured. The composition of the drilling fluid is shown in Table 5 below.

TABLE 5

| | Concentration (ppb) |
|---|---|
| CaCl₂ brine | 380 |
| Starch | 8 |
| CaCO₃ | 50 |
| Calcium Stearate | 15 |

The drilling fluid was passed through a sandstone formation core plug at about 3.45 MPa (about 500 psi) and a temperature of about 132.2° C. (about 270° F.) using a HPHT filter press, similar to the drilling fluids of Example 3. After the filtercake was formed, a hydrocarbon was allowed to pass through the sandstone formation and through the filtercake. The return permeability (e.g., the flowrate of the hydrocarbons through the filtercake) increased with time, indicating that the calcium stearate dissolved responsive to exposure to the hydrocarbons and formed channels through which the hydrocarbons flowed. After flowback with the hydrocarbons, the filtercake was substantially completely dissolved.

The embodiments of wellbore (e.g., drilling) fluids including the fluid loss materials comprising the polymer and the bridging material have been primarily described with reference to wellbore drilling operations; the wellbore fluids including fluid loss materials described herein may be used in applications other than the drilling of a wellbore. In other embodiments, drilling fluids including the fluid loss materials according to the present disclosure may be used outside a wellbore or other downhole environment used for the exploration or production of natural resources. For instance, drilling fluids including the fluid loss materials of the present disclosure may be used in a borehole used for placement of utility lines. Accordingly, the terms "wellbore," "borehole," and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A wellbore fluid, comprising:
an aqueous base fluid;
a fluid loss material formulated and configured to form a filtercake on surfaces of an earth formation responsive to exposure to a wellbore pressure, the fluid loss material comprising:
at least one polymer; and
a bridging material comprising a fatty acid salt of at least one of lithium, sodium, potassium, rubidium, cesium, beryllium, magnesium, calcium, strontium, barium, radium, ammonium, quaternary ammonium, boron, aluminum, gallium, indium, carbon, silicon, germanium, tin, lead, nitrogen, phosphorus, arsenic, antimony, bismuth, copper, silver, gold, zinc, cadmium, manganese, technetium, or rhenium, the bridging material comprising an oil-soluble material formulated and configured to dissolve out of the filtercake to form channels in the filtercake, wherein the bridging material is present in the wellbore fluid at a concentration within a range of from about 14.3 kg/m$^3$ to about 200.0 kg/m$^3$, and wherein a particle size of the bridging material is within a range of from about 2 micrometers to about 100 micrometers; and an additional bridging material comprising hydrophobically-coated particles of at least one of calcium carbonate, zinc carbonate, barium carbonate, a metal oxide, dolomite, colemanite, ulexite, analcite, apatite, bauxite, brucite, gibbsite, hydrotalcite, galena, hematite, magnetite, iron oxides, siderite, or celestite.

2. The wellbore fluid of claim 1, wherein the at least one polymer comprises starch.

3. The wellbore fluid of claim 1, wherein the at least one polymer comprises hydrophobic starch.

4. The wellbore fluid of claim 1, wherein the at least one polymer comprises at least one of xanthan gum, polyanionic cellulose, carboxymethylcellulose, carboxymethyl hydroxyethylcellulose, hydroxyalkylcellulose, hydrophobically-modified cellulose, glycogen, locust bean gum, wellan gum, scleroglucan gum, guar gum, carrageenan, gellan gum, or alginate.

5. The wellbore fluid of claim 1, wherein the at least one polymer comprises at least one of a polyacrylate, a polyacrylate ester, polyacrylamide, styrene, styrene-butadiene, an acrylamide acrylate polymer, an acrylamido-methyl-propane sulfonate polymer, a reaction product of at least one acrylamide monomer and at least one sulfonated anionic monomer, a hydrophobically-modified synthetic polymer, or a vinyl polymer.

6. The wellbore fluid of claim 1, wherein the bridging material comprises calcium stearate.

7. The wellbore fluid of claim 1, wherein the bridging material and the at least one polymer are hydrophobic.

8. The wellbore fluid of claim 1, wherein the additional bridging material comprises hydrophobically-coated calcium carbonate.

9. The wellbore fluid of claim 1, wherein the fatty acid salt comprises at least one fatty acid salt of a first fatty acid and at least a second fatty acid salt of a second fatty acid.

10. The wellbore fluid of claim 1, wherein:
the at least one polymer comprises hydrophobic starch; and
the bridging material comprises a stearate.

11. The wellbore fluid of claim 1, wherein the at least one polymer is present in the wellbore fluid at a concentration within a range of from about 10 kg/m$^3$ to about 200 kg/m$^3$.

12. The wellbore fluid of claim 1, further comprising a weighting material.

13. The wellbore fluid of claim 1, wherein the aqueous base fluid comprises brine.

14. A method of operating a wellbore, the method comprising:
pumping the wellbore fluid of claim 1 into a wellbore extending through an earth formation;
forming a filtercake on surfaces of the earth formation;
exposing the filtercake to a hydrocarbon from the earth formation;
dissolving the bridging material from the filtercake responsive to exposure of the filtercake to the hydrocarbon to form channels extending through the filtercake; and
producing hydrocarbons through the channels.

15. The method of claim 14, wherein the bridging material of the wellbore fluid comprises calcium stearate.

16. The method of claim 14, wherein the at least one polymer of the wellbore fluid comprises hydrophobic starch.

17. The wellbore fluid of claim 1, wherein the at least one polymer comprises starch modified by at least one of crosslinking, hydroxyalkylation, or carboxymethylation.

18. The wellbore fluid of claim 17, wherein the at least one polymer comprises crosslinked starch, and wherein the crosslinked starch comprises a crosslinker comprising from about 0.5 weight percent to about 10.0 weight percent of the crosslinked starch.

19. The wellbore fluid of claim 1, wherein:
the at least one polymer comprises starch;
the at least one polymer is present in the wellbore fluid at a concentration within a range of from about 10 kg/m$^3$ to about 150 kg/m$^3$;
the bridging material comprises calcium stearate;
the bridging material is present in the wellbore fluid at a concentration within a range of from about 14.3 kg/m$^3$ to about 142.5 kg/m$^3$;
a weight ratio of the at least one polymer to the bridging material in the wellbore fluid is within a range of from about 0.01:1.0 to about 2.0:1.0;
the aqueous base fluid comprises brine comprising water and one or more salts, the one or more salts including at least one divalent halide; and
the wellbore fluid further comprises at least one weighting material selected from the group consisting of barite, iron oxide, calcium carbonate, magnesium carbonate, manganese oxide, and any combination thereof.

*   *   *   *   *